US009740396B1

(12) United States Patent
Ahaus et al.

(10) Patent No.: US 9,740,396 B1
(45) Date of Patent: Aug. 22, 2017

(54) ADAPTIVE GESTURE RECOGNITION

(71) Applicant: Amazon Technologies, Inc., Reno, NV (US)

(72) Inventors: Juergen Ahaus, San Jose, CA (US); Arnaud Marie Froment, San Jose, CA (US); Kenneth Paul Kiraly, Menlo Park, CA (US); Jonathan Ian McCormack, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 528 days.

(21) Appl. No.: 14/315,028

(22) Filed: Jun. 25, 2014

(51) Int. Cl.
*G06F 3/048* (2013.01)
*G06F 3/0488* (2013.01)
*G06F 3/01* (2006.01)

(52) U.S. Cl.
CPC ............ *G06F 3/0488* (2013.01); *G06F 3/016* (2013.01)

(58) Field of Classification Search
CPC ................................ G06F 3/0488; G06F 3/016
USPC .......................................................... 715/702
See application file for complete search history.

(56) References Cited

U.S. PATENT DOCUMENTS

| | | | | |
|---|---|---|---|---|
| 2008/0158432 A1* | 7/2008 | Hwang | .................... | H01Q 1/24 348/725 |
| 2009/0174675 A1* | 7/2009 | Gillespie | ............... | G06F 3/0416 345/173 |
| 2009/0271004 A1* | 10/2009 | Zecchin | ................. | G05B 15/02 700/13 |
| 2010/0103918 A1* | 4/2010 | Song | .................... | H04B 13/005 370/343 |
| 2012/0236030 A1* | 9/2012 | Border | ............... | G02B 27/0093 345/633 |
| 2013/0265437 A1* | 10/2013 | Thorn | ..................... | G06F 3/011 348/164 |
| 2013/0321009 A1* | 12/2013 | Aliakseyeu | ............. | G06F 3/017 324/699 |
| 2014/0063054 A1* | 3/2014 | Osterhout | ............... | G06F 3/005 345/633 |
| 2014/0143784 A1* | 5/2014 | Mistry | ................ | G06F 15/0208 718/102 |
| 2014/0267136 A1* | 9/2014 | Phipps | ................ | G06F 3/03547 345/174 |
| 2015/0123949 A1* | 5/2015 | Li | ........................... | G06F 3/043 345/177 |
| 2015/0160731 A1* | 6/2015 | Yun | ........................ | G06F 3/017 715/740 |
| 2015/0185885 A1* | 7/2015 | Lacroix | ................... | G06F 3/041 345/173 |

(Continued)

*Primary Examiner* — David Phantana Angkool
(74) *Attorney, Agent, or Firm* — Eversheds Sutherland (US) LLP

(57) ABSTRACT

Systems, methods, and computer-readable media are disclosed for receiving sensor data indicative of one or more vibrational and/or environmental characteristics associated with a user device, a user of the user device, and/or an environment that includes the user device; determining a value for a metric representative of the one or more characteristics; determining a value of a gesture detection parameter based at least in part on the value of the metric; receiving input corresponding to a touch event detected at a touch-sensitive display of the device; and analyzing the input based at least in part on the value of the gesture detection parameter to determine whether the touch event corresponds to a particular type of gesture.

20 Claims, 9 Drawing Sheets

(56) References Cited

U.S. PATENT DOCUMENTS

2015/0277743 A1* 10/2015 Isherwood ............ G06F 1/1626
715/863
2016/0275277 A1* 9/2016 Huang .................. G06F 21/316

* cited by examiner

ADAPTIVE GESTURE RECOGNITION

BACKGROUND

Electronic devices with touch-sensitive or touch-enabled displays have become widespread. Such electronic devices may be configured to recognize and differentiate among a variety of different types of touches or gestures that may be applied to the display. For example, such devices may be configured to recognize and differentiate between a tap, a swipe, or another type of gesture based on differences in the touch input generated by these different types of gestures. Users may use touch-sensitive devices in a variety of environmental and vibrational conditions. Some of these conditions may make it more difficult for a user to interact with a touch-sensitive display in an intended manner, and thus, may decrease the likelihood that a particular touch event is interpreted as an intended type of gesture and properly differentiated from another type of gesture.

BRIEF DESCRIPTION OF THE DRAWINGS

The detailed description is set forth with reference to the accompanying drawings. The drawings are provided for purposes of illustration only and merely depict example embodiments of the disclosure. The drawings may not be drawn to scale. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
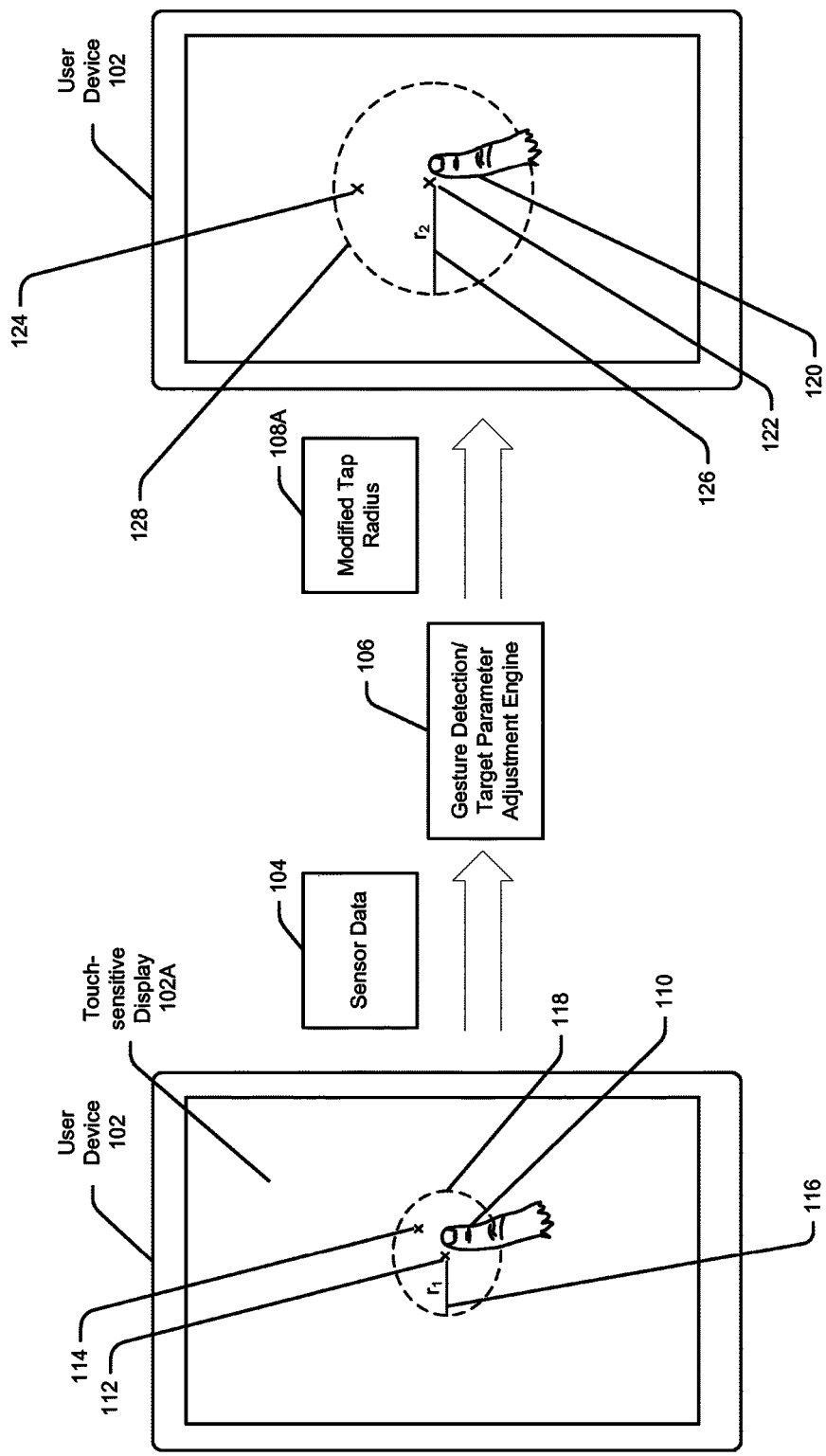
FIGS. 1A-1C are schematic diagrams illustrating various types of gesture detection parameters that may be modified and various modifications that may be made to such parameters to increase the likelihood that a touch event is detected as an intended type of gesture and differentiated from another type of gesture in accordance with one or more example embodiments of the disclosure.

This disclosure relates to, among other things, systems, methods, computer-readable media, techniques, and methodologies for adjusting the values of one or more gesture detection parameters based on vibrational and/or environmental conditions associated with a user device, a user of the user device, and/or an environment in which the user device is used in order to enhance the likelihood that a detected touch event is interpreted as an intended type of gesture while the vibrational and/or environmental conditions are present. As used herein, the term "touch event" may refer to any user interaction with a touch-sensitive display of a device that is capable of being detected by the device. Further, as used herein, the term "gesture" may include any of a variety of types of touch events that may be associated with predefined functions such as, for example, taps (e.g., single taps, double taps, multiple points-of-contact taps, etc.), swipes (e.g., scrolling, flicks, pinches, zooms, rotates, etc.), and so forth. Example embodiments of the disclosure may also relate to other forms of non-touch user interaction with a device. For example, a user's position in space relative to a device may be detected by one or more sensors as a form of user interaction with the device.

In various example embodiments, a variety of types of sensor data may be captured. The sensor data may, for example, indicate vibrational characteristics of a user device and/or a user of the user device. In other example embodiments, the sensor data may indicate environmental characteristics associated with an environment in which the user device is used. The sensor data may be captured by a variety of types of sensors.

For example, the sensor data may include motion data such as acceleration data captured by an inertial sensor, in which case, the acceleration data may indicate acceleration of the user device along one or more axes. Such inertial sensors may be provided as part of a user device and may include, without limitation, accelerometers (e.g., single or multi-axis accelerometers), gyroscopic sensors, piezoelectric sensors, or the like. The acceleration data may be received, for example, as a series of acceleration vectors representative of acceleration of the user device along one or more axes over a period of time. As will be described in more detail later in this disclosure, a value of a vibration metric may be determined based at least in part on the acceleration data. Thus, in certain example embodiments, a vibration metric determined from acceleration data may serve as a proxy for a vibration level of a user device and/or a user of the device.

As another non-limiting example, the sensor data may include image data of a user of a user device captured by an image sensor (e.g., a camera) that may be embedded in, integrated with, or otherwise associated with the user device. The image data may indicate, for example, vibration of a user's hand prior to interaction with a touch-sensitive display of the device. An image sensor or other types of sensors (e.g., proximity sensors) may be used to determine a position of an object (e.g., a user's hand, finger, etc.) in three-dimensional space relative to a reference point associated with a user device (e.g., a particular location on a display of the device). Deviations between the detected position and the reference point may be monitored prior to a touch event occurring, and these deviations may be used to determine a vibration level for the user. In addition, a vibration level determined in the manner described above may also be used to assist in identifying gestures (e.g., in-the-air gestures) that do not require a physical touch of a display. In addition, optical image stabilizers may be leveraged to determine movement of the device (including device movement that results from user vibration) in order to estimate a vibration level for the device and/or user.

Vibration present in a user or user device may be caused by environmental conditions (e.g., temperature conditions), conditions inherently associated with the user (e.g., a particular health condition that the user suffers from), or the like. A wearable computing device may also be provided to capture vibrational data relating to a user. Data may also be captured by various other types of sensors including, without limitation, sensors that monitor heart rate, blood pressure, etc.; sensors that monitor changes or movement in the position of a stylus or other touch-input device prior to contact with a touch-sensitive display; and so forth. A vibration metric derived from such data may serve as a proxy for a vibration level of a user.

As yet another non-limiting example, the sensor data may include data indicative of an environmental characteristic associated with an environment in which a user device is operated. For example, the sensor data may include thermal data sensed by a temperature sensing device (e.g., thermometer) that may be embedded in, integrated with, or otherwise associated with a user device. The temperature sensing device may detect an ambient temperature around the user device which may, in turn, be correlated with a vibrational characteristic of the user device and/or a user of the user device. For example, colder temperatures may cause a user's hand to shake more than it would in warmer temperatures. In certain other example embodiments, an ambient temperature may be correlated with a reduced accuracy or precision of user interaction with a touch-sensitive display that may not be vibrational in nature (e.g., it may more likely be that a user is wearing gloves in colder temperatures).

As still another non-limiting example, the sensor data may include ambient light data sensed, for example, by an ambient light sensor that may be embedded in, integrated with, or otherwise associated with a user device. The ambient light sensor may detect an amount of ambient light reaching a display of the user device. Even if the display of the device is backlit, lower ambient light levels may reduce the accuracy or precision of a user's interaction with the display.

As yet another non-limiting example, the sensor data may include audio data representative of ambient noise in an environment in which a user device is operated. The audio data may include an audio signature that is indicative of a particular type of environment. For example, if a user is traveling in a train, plane, or the like, ambient noise that is typically present in such environments may have a corresponding audio signature that allows for one type of environment to be differentiated from another type of environment. Once an audio signature is used to identify a particular type of environment, the environment may be correlated to a particular vibration level for the user device and/or user based on, for example, a predefined mapping or the like.

As alluded to earlier, in certain example embodiments, a value of a metric may be determined based at least in part on sensor data. The metric may be representative of a vibrational characteristic associated with a user device, a vibrational characteristic associated with a user of the user device, and/or an environmental characteristic associated with an environment in which the device is being used. For example, the metric may be a vibration metric that serves as a suitable proxy for a vibration level or an amount of vibration associated with a user device. In certain example embodiments, the vibration metric may be derived from acceleration data captured by an inertial sensor of a user device. The vibration metric may be derived by, for example, applying an averaging function (or other suitable smoothing function) to the magnitudes of a series of acceleration vectors received over some period of time. In other example embodiments, a vibration metric may be derived from image data or other forms of data indicative of movement or vibration of a user (e.g., a user's hand) or movement or vibration of a touch-input device prior to initiation of contact with a touch-sensitive display. In such example embodiments, the vibration metric may represent an average (or other statistical measure) of an amount of deviation from a reference point.

In certain other example embodiments, an environment metric representative of an environmental characteristic associated with an environment in which a user device is used may be determined based on sensor data. The environment metric may take on any suitable form such as, for example, an instantaneous measure of ambient temperature; an average or other statistical measure (e.g., median, mode, standard deviation, variance, etc.) of ambient temperature over some period of time; an instantaneous measure of ambient light; a statistical measure of ambient light over some period of time; and so forth. It should be appreciated that, in certain example embodiments, the vibration metric may be indicative of an environmental characteristic in addition to a vibrational characteristic, and similarly, the environment metric may be indicative of a vibrational characteristic in addition to an environmental characteristic.

In certain example embodiments, an environment metric may be correlated to a particular vibration level based, for example, on a predetermined stored mapping. For example, an environment metric (e.g., an ambient temperature measurement, an ambient light measurement, an audio signature, etc.) may be determined to correspond to an expected amount of vibration. As such, the environment metric may serve as a proxy for a vibration level. In other example embodiments, a vibration metric may be derived from an environment metric based on the aforementioned stored mapping. In certain example embodiments, a vibration level may be directly or inversely correlated with an intensity of an environment metric. For example, as an ambient temperature or ambient light level decreases, a corresponding vibration level correlated to the ambient temperature or ambient light level may increase. In another example, as the intensity of audio data increases, this may indicate a closer proximity to a source of ambient noise, and thus, an increased amount of vibration. Alternatively, in certain situations, an increase in the intensity of audio data may actually indicate a reduced amount of vibration. For example, a user located in closer proximity to a front locomotive may actually experience less vibration than a user located farther away.

In certain example embodiments, a value of a gesture detection parameter may then be determined based on the value of a vibration or environment metric. For example, the value of a vibration or environment metric may be provided as input to a gesture detection parameter determination function to generate the value of a gesture detection parameter. The gesture detection parameter determination function may be a continuous function having a linear portion, a sigmoidal function, a step-wise function, or the like.

The gesture detection parameter may include any suitable parameter that may be used to determine the particular type of gesture to which a touch event may correspond. A gesture detection parameter may include, for example, a tap radius, a minimum swipe distance, a threshold swipe angle, a peak permissible deviation from a threshold swipe angle, or the like. Each of these example types of gesture detection parameters will be discussed in more detail later in this disclosure.

In certain example embodiments, a value of a gesture target parameter may also be determined based on the value of a vibration or environment metric. For example, the value of a vibration or environment metric may be provided as input to a gesture target parameter determination function to generate the value of a gesture target parameter. The gesture target parameter determination function may be a continuous function having a linear portion, a sigmoidal function, a step-wise function, or the like. A gesture target parameter may include, for example, a size of a detectable area corresponding to a selectable user interface element presented on a touch-sensitive display of a user device, a size of the selectable user interface element, or the like.

In an example embodiment of the disclosure, a gesture detection parameter may be set at a first value. The first value may have been determined based on a first value of a vibration or environment metric which, in turn, may have been determined based on first sensor data. As previously noted, the first value of the gesture detection parameter may correspond to a first tap radius, a first threshold swipe angle, a first minimum swipe distance, a first peak permissible deviation from a threshold swipe angle, or the like.

Upon receipt of second sensor data, a second value for the vibration or environment metric may be determined. Depending on the nature of the second sensor data, the second value of the metric may indicate an increase in an amount of vibration or movement of a user device and/or a user as compared to the first value of the metric. Additionally, or alternatively, the second value of the metric may indicate a change in an ambient temperature, a change in an ambient light level, a change in an ambient noise level, or a change in some other environmental characteristic as compared to the first value of the metric.

The first value of the gesture detection parameter may then be modified to a second value based on the second value of the vibration or environment metric. For example, a gesture detection parameter determination function may receive the second value of the vibration or environment metric as input, and may generate the second value of the gesture detection parameter as output. The second value of the gesture detection parameter may correspond to a second tap radius, a second threshold swipe angle, a second minimum swipe distance, a second peak permissible deviation from a threshold swipe angle, or the like.

For example, in relation to the first sensor data, the second sensor data may indicate: 1) an increase in the amount of vibration/movement of a user device or a user and/or 2) a change in an environmental characteristic that may lead to an increase in the amount of vibration/movement of a user device or a user (or an otherwise increased difficulty and reduced accuracy associated with user interaction with a user device). Accordingly, the second value of the vibration or environment metric may indicate any of the changed set of circumstances described above. For example, the second value of the vibration or environment metric may be greater than the first value of the metric, and the difference between the second value and the first value of the metric may be representative of an increased vibration/movement level associated with a user device or a user of the user device and/or a changed environmental characteristic (e.g., an increase or decrease in ambient temperature, an increase or decrease in ambient light, an increase or decrease in ambient noise, etc.).

In such example embodiments, the second value of the gesture detection parameter may be selected so as to compensate for the altered vibrational and/or environmental state described above, and thereby enhance the likelihood that a touch event is properly interpreted as an intended type of gesture.

For example, if the gesture detection parameter is a tap radius, the value of the parameter may be increased from a first tap radius to a second tap radius. Evaluation of a touch event with respect to the second tap radius as opposed to the first tap radius may result in a greater breadth of touch events being interpreted as taps, and thus, may compensate for less precise user interaction with a touch-sensitive display that may result from increased vibration/movement of the user device and/or user. More specifically, an increase in the tap radius from a first tap radius to a second tap radius may result in a determination that a touch event is a tap even if the distance between a first position corresponding to initiation of the touch event and a second position corresponding to completion of the touch event is greater than the first tap radius, as long as the distance between the first position and the second position does not exceed the second tap radius. Initiation of a touch event may be referred to hereinafter as "touch-down," and completion of a touch event may be referred to hereinafter as "touch-up." These terms are used solely for ease of explanation and shall not be deemed limiting in any way.

As another non-limiting example, if the gesture detection parameter is a minimum swipe distance, the value of the parameter may be decreased from a first minimum swipe distance to a second minimum swipe distance. An increase in the amount of vibration/movement of a user device and/or a user may increase the likelihood that an intended swipe is completed prematurely, that is, that touch-up occurs before a user intended to complete the swipe. Accordingly, a reduction in the minimum swipe distance may allow touch events associated with premature touch-ups to be interpreted as swipes. Stated another way, touch events that fail to traverse a path between touch-down and touch-up that meets or exceeds the first minimum swipe distance, may nonetheless be interpreted as swipes based on a determination that the path traversed meets or exceeds the lesser second minimum swipe distance.

As yet another non-limiting example, if the gesture detection parameter is a threshold swipe angle, it may be increased from a first threshold swipe angle to a second threshold swipe angle. An increase in the amount of vibration/movement of a user device and/or a user may increase the likelihood that a path traversed by an intended swipe between touch-down and touch-up crosses outside of a sector bounded by the first threshold swipe angle. Accordingly, an increase in the threshold swipe angle from the first threshold swipe angle to the second threshold swipe angle may increase the sector area that a swipe path may traverse and still be detected as a swipe. Stated another way, touch events that traverse paths between touch-down and touch-up that cross outside of a sector area bounded by the first threshold swipe angle, may nonetheless be interpreted as swipes based on a determination that the paths traversed lie entirely within a larger sector area bounded by the second threshold swipe angle.

As still another non-limiting example, if the gesture detection parameter is a peak permissible deviation from a threshold swipe angle, the value of the parameter may be increased from a first peak permissible deviation to a second peak permissible deviation. The peak permissible deviation may correspond to a peak permissible distance between any point along a path traversed by a touch event between touch-down and touch-up and a reference line that corresponds to a boundary associated with the threshold swipe angle. Alternatively, the peak permissible distance may be measured from a reference line corresponding to an ideal swipe path. The reference line may be horizontal, vertical, or at any suitable angle with respect to the horizontal or vertical line (e.g., a diagonal line at a 45 degree angle).

An increase in the amount of vibration/movement of a user device and/or a user may increase the likelihood that a path traversed by a touch event between touch-down and touch-up includes unintended deviations from an intended swipe path. Accordingly, an increase in the peak permissible deviation from the threshold swipe angle from a first peak permissible deviation to a second peak permissible deviation may compensate for the larger unintended deviations from an intended swipe path that may result from, for example, abrupt changes in the vibration/movement of the user device or the user. Stated another way, the path traversed by a touch event between touch-down and touch-up may include a peak deviation from the threshold swipe angle that exceeds the first peak permissible deviation, but may nonetheless be interpreted as a swipe based on a determination that the peak deviation does not exceed the second peak permissible deviation.

It should be appreciated that values of multiple ones of the gesture detection parameters described above may be modified based on the vibration/environment metric generated from the second sensor data. It should further be appreciated that the example gesture detection parameters described above are merely illustrative and not exhaustive.

In addition to modifying the values of gesture detection parameter(s), the respective value(s) of one or more gesture target parameter(s) may also be modified based on the second value of the vibration/environment metric. For example, the size of a detectable target area associated with a user interface element (a button, icon, or the like) may be increased in order to compensate for the increased likelihood of a deviation between an actual touch-down position and an intended touch-down position of a touch event, and thereby avoid a decreased likelihood that a particular user interface element is determined to be the target of a touch event (e.g., a tap) that may otherwise have resulted from an increase in the vibrational state of a user device and/or a user. As another non-limiting example, the size of a user interface element may be decreased in order to incentivize a user to attempt to select the user interface element with greater precision under circumstances involving increased vibration/movement.

Example embodiments of the disclosure provide a number of advantages or technical effects. For example, in accordance with the example embodiments of the disclosure, a touch event may be interpreted as an intended type of a gesture, and optionally, a target of the gesture may be accurately identified despite the presence of conditions that may result in reduced accuracy or precision of user interaction with a touch-sensitive display. Such conditions may include, for example, increased vibration of a user device, increased vibration of a user, and/or environmental conditions that may result in increased vibration of a user device or a user (or that may otherwise result in reduced accuracy or precision of user interaction with a user device). As another non-limiting example, continuous modification of values of gesture detection parameters based on the values of vibration/environment metrics generated from sensor data may result in a seamless user experience despite changes in vibrational and/or environmental conditions. It should be appreciated that the above examples of advantages and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Cases and Device Architecture

Figure 1B:
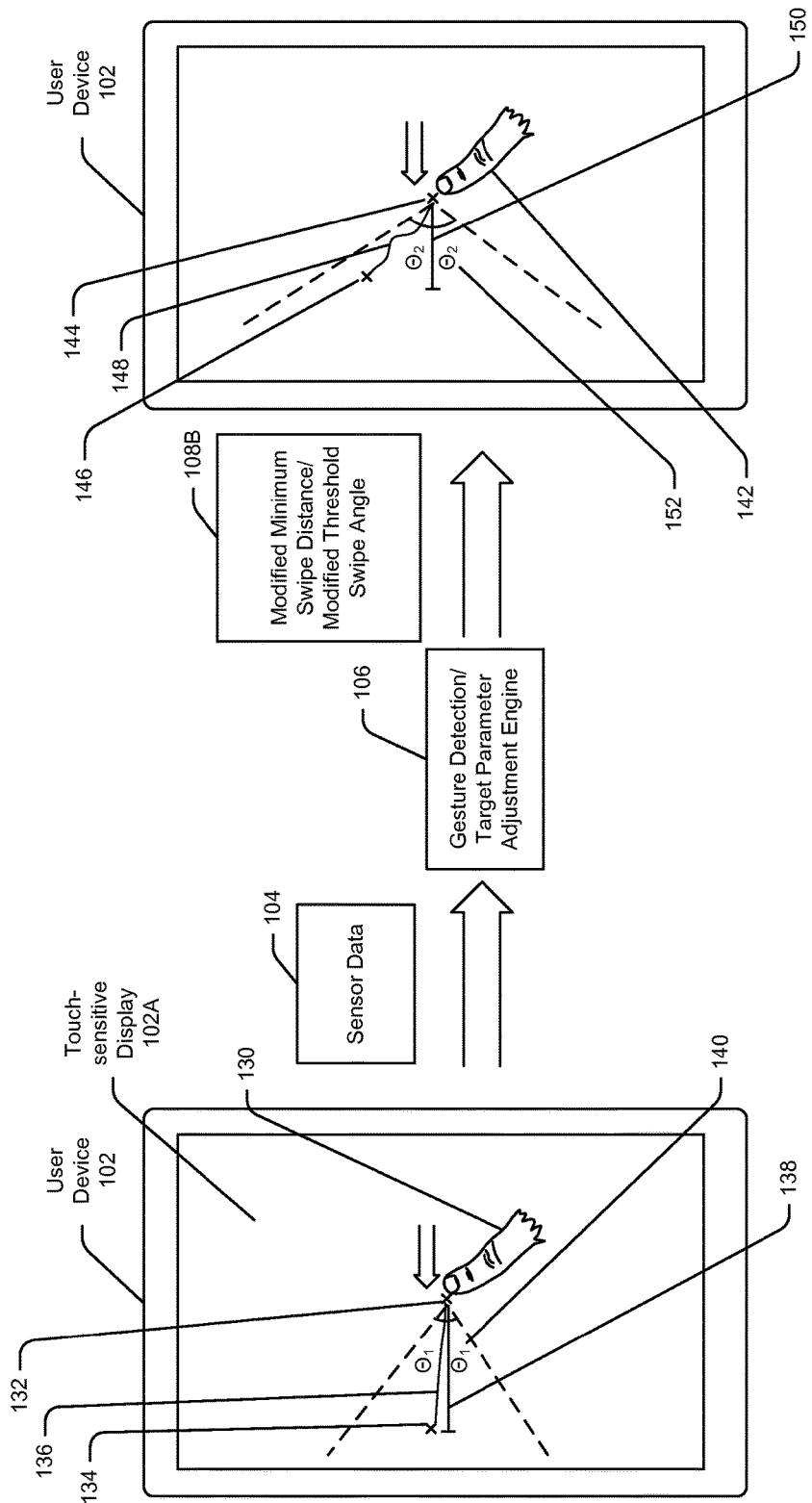
Figure 1C:
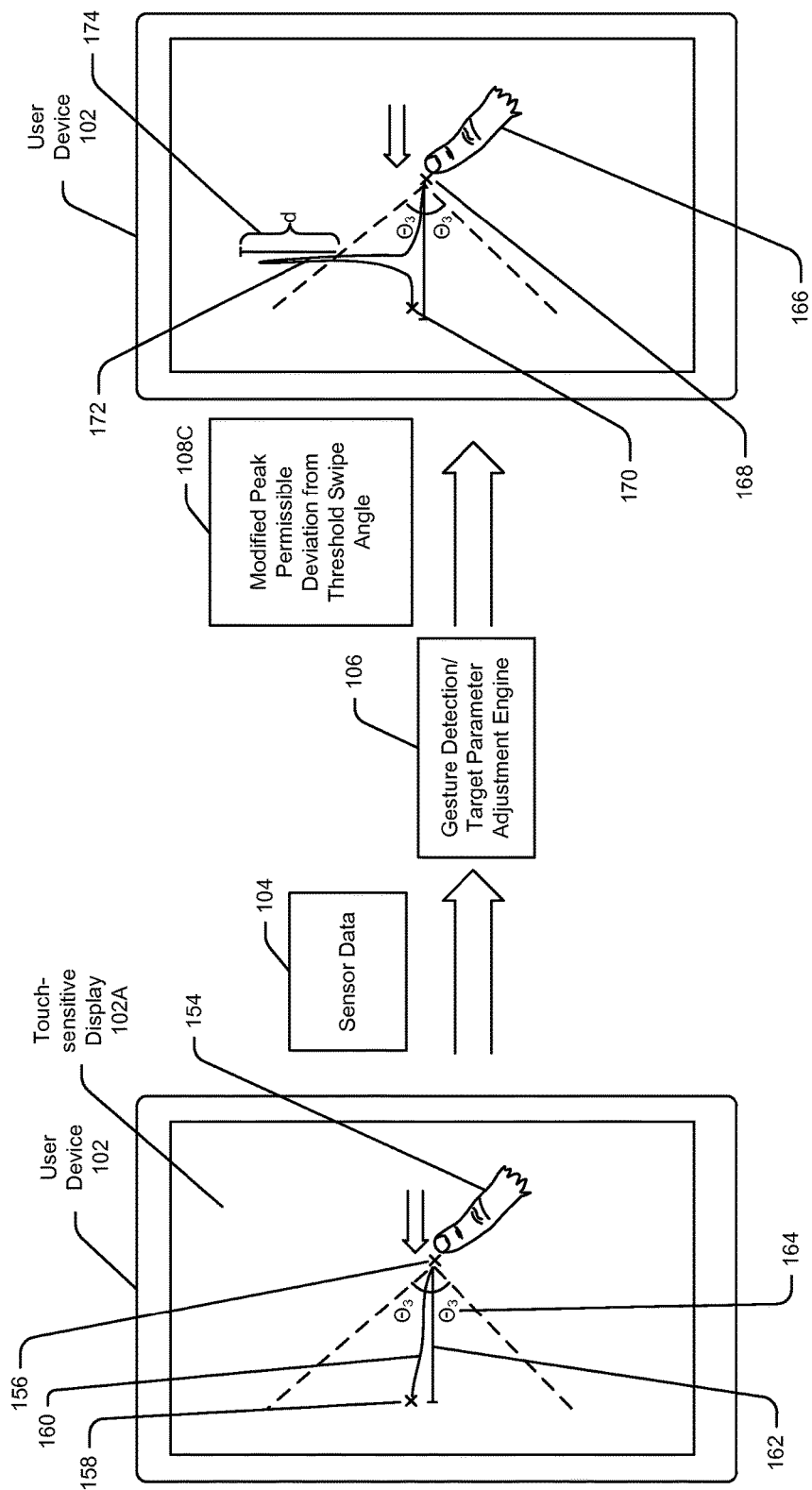

FIGS. 1A-1C are schematic diagrams illustrating various types of gesture detection parameters that may be modified and various modifications that may be made to such parameters to increase the likelihood that a touch event is detected as a particular type of gesture and differentiated from another type of gesture in accordance with one or more example embodiments of the disclosure.

FIG. 1A depicts an example embodiment in which a tap radius may be modified based on the value of a vibration/environment metric generated from sensor data. A user device 102 may include a touch-sensitive display 102A. A touch event 110 may include a touch-down position 112 and a touch-up position 114. A tap radius 116 may have a current value of $r_1$. The value of the tap radius 116 may have been determined based on a first value of a vibration/environment metric which may, in turn, have been generated from previously received sensor data (not shown). The touch event 110 may be determined to correspond to a tap based on a determination that the touch-up position 114 occurred within an area defined by a circle 118 having as its center the touch-down position 112 and the value $r_1$ as its radius 116. Stated another way, the touch event 110 may be determined to correspond to a tap based on a determination that a distance between the touch-down position 112 and the touch-up position 114 does not exceed the tap radius $r_1$.

The distance between a touch-down position and a touch-up position may be determined in any suitable manner such as, for example, as the magnitude of a vector having as its endpoints a first coordinate pair of an input sensor (e.g., a touch sensor) corresponding to the touch-down position and a second coordinate pair corresponding to the touch-up position. Any suitable metric of length (e.g., millimeters) derived from input sensor coordinates may also be used. A touch-down position (also referred to herein at times as a "first position") may be an initial position at which a capacitance, resistance, or other type of sensor measurement of an input sensor changes from a default state. A touch-up position (also referred to herein at times as a "second position") may be a final position at which the input sensor returns to the default state (e.g., no change in capacitance, resistance, or the like is detected by the input sensor). Completion of a touch event may refer to a time, input sensor coordinate, or the like associated with the touch-down position. In certain example embodiments, such as those involving in-the-air gestures, a first time corresponding to initial detection of the gesture and a second time corresponding to a cessation in detection of the gesture may be used in lieu of the touch-down and touch-up positions.

The user device 102 may then receive sensor data 104 indicative of one or more vibrational and/or environmental characteristics associated with the user device 102, a user of the user device 102, and/or an environment in which the user device 102 is operated. The sensor data 104 may indicate an increase in the vibration/movement of the user device and/or the user, or an otherwise reduced accuracy or precision of user interaction with the touch-sensitive display 102A that may result, for example, from a change in environmental conditions. The sensor data 104 may include any of the example types of data previously described.

A gesture detection/target parameter adjustment engine 106 may determine a second value for the vibration/environment metric based at least in part on the sensor data 104, and may further determine a modified value 108A for the tap radius. For example, the engine 106 may increase the tap radius from a first value of $r_1$ to a second value of $r_2$ based on the second value of the vibration/environment metric. The engine 106 may include any suitable combination of hardware, firmware, and/or software. In certain example embodiments, the second value of the vibration/environment metric and the second, modified value of the tap radius may be determined responsive to execution, by one or more processing units, of computer-executable instructions, code, or the like that may be provided as part of the engine 106 or accessible by the engine 106.

A second touch event 120 may occur subsequent to modification of the tap radius. The touch event 120 may include a touch-down position 122 and a touch-up position 124. The touch event 120 may be determined to correspond to a tap based on a determination that the touch-up position 124 occurred within an area defined by a circle 128 having as its center the touch-down position 122 and the value $r_2$ as its radius 126. Stated another way, the touch event 120 may be determined to correspond to a tap based on a determination that a distance between the touch-down position 122 and the touch-up position 124 does not exceed the value $r_2$ of the modified tap radius 126. The distance between the touch-down position 122 and the touch-up position 124 may, however, exceed the previous tap radius $r_1$, and if this is the case, would not have been interpreted as a tap if the previous tap radius $r_1$ was still being used as part of the criteria for determining that a touch event corresponds to a tap.

Thus, as depicted in FIG. 1A, evaluation of a touch event with respect to the second tap radius $r_2$ as opposed to the first tap radius $r_1$ may result in a greater breadth of touch events being interpreted as taps, and thus, may compensate for less precise user interaction with the touch-sensitive display 102A that may result from increased vibration/movement of the user device 102 and/or user.

In certain example embodiments, the geometry of the tap area may be modified based on the sensor data 104. For example, if some portion of the sensor data 104 (e.g., accelerometer data) indicates a greater amount of movement/vibration in a particular direction as opposed to another direction (e.g., in the y direction as opposed to the x direction), the tap area may be modified from a circular geometry to, for example, an elliptical geometry. In such example embodiments, the touch-down position 122 may represent a center of the ellipse or one of the two foci of the ellipse. It should be appreciated that the geometry of the tap area may be modified in any suitable manner.

FIG. 1B depicts an example embodiment in which a minimum swipe distance and/or a threshold swipe angle may be modified based on the value of a vibration/environment metric generated from sensor data. The user device 102 including the touch-sensitive display 102A is once again depicted. A touch event 130 may include a touch-down position 132 and a touch-up position 134. A first threshold swipe angle 130 may have a current value of $\theta_1$. The current threshold swipe angle $\theta_1$ may have been determined based on a first value of a vibration/environment metric that may have been generated from previously received sensor data (not shown). In certain example embodiments, the threshold swipe angle $\theta_1$ may define a sector that determines whether a path traversed between the touch-down position 132 and the touch-up position 134 will be interpreted as a swipe. The sector may be bounded by a line extending from the first position 132 at the angle $\theta_1$ with respect to a horizontal or vertical reference line 138. While a horizontal reference line 138 is depicted in FIG. 1B, it should be appreciated that a vertical reference line may be used if the touch event 130 corresponds to an intended swipe in the vertical direction. Alternatively, a reference line having any suitable angle with respect to the horizontal or vertical may be used. In certain example embodiments, the sector may be bounded by a line extending from the first position 132 above the reference line 138 (or to the right of a vertical reference line) at the angle $\theta_1$ and by a line extending from the first position 132 below the reference line 138 (or to the left of a vertical reference line) at the angle $\theta_1$. In other example embodiments, the sector may be bounded by the reference line 138 and either the line extending above the reference line 138 at the angle $\theta_1$ or the line extending below the reference line 138 at the angle $\theta_1$.

If a touch event includes a path traversed between a touch-down position and a touch-up position that lies entirely within a sector defined by a threshold swipe angle, the touch event may be interpreted as a swipe. Such a condition may be referred to hereinafter as a swipe path that does not exceed a threshold swipe angle. Thus, because a swipe path 136 corresponding to the touch event 130 does not exceed the threshold swipe angle $\theta_1$, the touch event 130 may be interpreted as a swipe.

The user device 102 may then receive sensor data 104 indicative of one or more vibrational and/or environmental characteristics associated with the user device 102, a user of the user device 102, and/or an environment in which the user device 102 is operated. The sensor data 104 may indicate an increase in the vibration/movement of the user device and/or the user, or an otherwise reduced accuracy or precision of user interaction with the touch-sensitive display 102A that may result, for example, from a change in environmental conditions. The gesture detection/target parameter adjustment engine 106 may determine a second value for the vibration/environment metric based at least in part on the sensor data 104, and may further determine a modified value 108B for the threshold swipe angle. For example, the engine 106 may increase the threshold swipe angle from a value of $\theta_1$ to a value of $\theta_2$ based on the second value of the vibration/environment metric.

A second touch event 142 may occur subsequent to determination of the modified threshold swipe angle 152. The touch event 142 may include a touch-down position 144 and a touch-up position 146. The touch event 142 may be determined to correspond to a swipe based on a determination that a swipe path 148 traversed between the touch-down position 144 and the touch-up position 146 does not exceed the modified threshold swipe angle $\theta_2$. The swipe path 148 may, however, exceed the first threshold swipe angle $\theta_1$.

As previously noted, the threshold swipe angle may be increased from the first threshold swipe angle 140 having a first value of $\theta_1$ to the second threshold swipe angle 152 having a second value of $\theta_2$ based on a modified value of a vibration/environment metric determined from the sensor data 104. The sensor data 104 may indicate, for example, an increased vibration level of the user device 102 and/or a user of the user device or a change in an environmental characteristic indicating an increased vibration level or an otherwise reduced accuracy or precision of user interaction with the touch-sensitive display 102A. Thus, by increasing the threshold swipe angle from $\theta_1$ to $\theta_2$, the swipe path 148—which otherwise may have exceeded the first threshold swipe angle $\theta_1$ and thus may not have been interpreted as a swipe—instead does not exceed the second threshold swipe angle $\theta_2$, and thus, may be interpreted as a swipe. Thus, the increased likelihood of deviation from an ideal swipe path that may result from increased vibration or otherwise reduced accuracy or precision of user interaction with the touch-sensitive display 102A may be compensated for by an increased threshold swipe angle.

In certain example embodiments, a value corresponding to a minimum swipe distance may be modified based on the sensor data 104 in addition to, or in lieu of, modifying a threshold swipe angle. For example, if the sensor data 104 indicates an increased vibration level of the user device 102 and/or a user of the user device 102 (or an otherwise reduced accuracy or precision of user interaction with the touch-sensitive display 102A), the engine 106 may determine a modified value for a vibration/environment metric based on the sensor data 104, and may further modify a minimum swipe distance. More specifically, a first minimum swipe distance (represented schematically by the length of the reference line 138) may be decreased to a second minimum swipe distance (represented schematically by the length of the reference line 150).

An increase in the amount of vibration/movement of the user device 102 and/or a user of the user device 102 may increase the likelihood that an intended swipe is completed prematurely, that is, that touch-up occurs before a user intended to complete the swipe. Accordingly, by reducing the minimum swipe distance from the first minimum swipe distance to the second minimum swipe distance, touch events that otherwise would not have been interpreted as swipes (e.g., touch events associated with premature touch-ups) may be properly interpreted as swipes. For example, the swipe path 148 associated with the touch event 142 may not meet or exceed the first minimum swipe distance represented by the length of the reference line 138, but may meet or exceed the second minimum swipe distance represented by the length of the reference line 150. It should be appreciated that the length of the tap radii depicted in FIG. 1A may bear no relation to the length of the reference lines 138, 150 depicted in FIG. 1B.

In certain other example embodiments, the minimum swipe distance may remain unchanged or may, in fact, increase. For example, increased vibration of the user device 102 and/or a user of the device 102 may result in an unintentionally longer swipe path than would occur under reduced vibrational conditions. Accordingly, the minimum swipe distance may be increased to decrease the likelihood that a gesture intended as a tap is inadvertently interpreted as a swipe. Still further, in certain example embodiments, a swipe path may be smoothed by determining a straight line distance from a touch-down position (e.g., touch-down position 144) and a touch-up position (e.g., touch-up position 146), and the straight line distance may be compared to a minimum swipe distance to determine whether a gesture is a swipe.

FIG. 1C depicts an example embodiment in which a peak permissible deviation from a threshold swipe angle may be modified based on the value of a vibration/environment metric generated from sensor data. The user device 102 including the touch-sensitive display 102A is once again depicted. A touch event 154 may include a touch-down position 156 and a touch-up position 158. A swipe path 160 corresponding to the touch event 154 is depicted as not exceeding a threshold swipe angle $\theta_3$ 164, and thus, the touch event 154 may be interpreted as a swipe.

In certain example embodiments, the swipe path 160 may be determined not to exceed the threshold swipe angle $\theta_3$ 164 if an entirety of the swipe path 160 lies within a sector defined by one or both of a line extending above or a line extending below the reference line 162 at an angle of $\theta_3$ 164, which may correspond to a peak permissible deviation of zero. Alternatively, while not shown in FIG. 1C, a first peak permissible deviation associated with the scenario depicted on the left side of FIG. 1C may be non-zero. As previously described, a peak permissible deviation may correspond to a peak permissible distance between any point along a path traversed by a touch event between touch-down and touch-up and a corresponding point along a boundary line associated with a threshold swipe angle. The boundary line may correspond to a line that extends above or below a horizontal reference line (e.g., the reference line 162) at the threshold swipe angle (e.g., $\theta_3$ 164) or that extends to the left or right of a vertical reference line (not shown) at the threshold swipe angle. As previously noted, in various example embodiments of the disclosure, a diagonal line may be used as a reference line.

The user device 102 may then receive sensor data 104 indicative of one or more vibrational and/or environmental characteristics associated with the user device 102, a user of the user device 102, and/or an environment in which the user device 102 is operated. The sensor data 104 may indicate an increase in the vibration/movement of the user device and/or the user, or an otherwise reduced accuracy or precision of user interaction with the touch-sensitive display 102A that may result, for example, from a change in environmental conditions. The gesture detection/target parameter adjustment engine 106 may determine a modified value for a vibration/environment metric based at least in part on the sensor data 104, and may further determine a modified value 108C for the peak permissible deviation gesture detection parameter. More specifically, the modified peak permissible deviation 174 may correspond to a peak permissible distance between any point along a path traversed by a touch event between touch-down and touch-up and a corresponding point along a boundary line associated with the threshold swipe angle $\theta_3$ 164.

A second touch event 166 may occur subsequent to determination of the modified peak permissible deviation 174. The touch event 166 may include a touch-down position 168 and a touch-up position 170. The touch event 166 may be determined to correspond to a swipe based on a determination that no point along a swipe path 172 traversed between the touch-down position 168 and the touch-up position 170 extends more than the peak permissible deviation 174 from a corresponding point along, for example, a boundary line corresponding to a line extending above the horizontal reference line 162 at the threshold swipe angle $\theta_3$ 164.

An increase in the amount of vibration/movement of the user device 102 and/or a user may increase the likelihood that a path traversed by a touch event between touch-down and touch-up includes unintended deviations from an intended swipe path. Accordingly, increasing the peak permissible deviation may compensate for unintended deviations from an intended swipe path that may result from, for example, abrupt changes in the vibration/movement of the user device 102 or the user. For example, although the swipe path 172 may include a point that exceeds the first peak permissible deviation, upon modifying the peak permissible deviation, a peak deviation of the swipe path 172 from the boundary line may not exceed the modified peak permissible deviation 174, and thus, the touch event 166 may be properly interpreted as a swipe.

Although the minimum swipe distance and the threshold swipe angle are not depicted as being modified in FIG. 1C, it should be appreciated that values corresponding to these other gesture detection parameters may be modified as well. In fact, as previously noted, value(s) for any one or more gesture detection parameters may be modified based on the same sensor data. Further, while the peak permissible distance has been described in relation to a boundary line corresponding to a line that extends above or below (or to the right or left) of a horizontal or vertical reference line at the threshold swipe angle, in alternative example embodiments, the peak permissible distance may be measured from a horizontal, vertical, or diagonal reference line corresponding to an ideal swipe path (e.g., the reference line 162).

It should be appreciated that the gesture detection parameters and the modifications to the values of such parameters described through reference to FIGS. 1A-1C are merely illustrative and not exhaustive. It should further be appreciated that additional criteria beyond that which is described may need to be satisfied in certain example embodiments in order for a touch event to be identified as a particular type of gesture such as, for example, a tap or a swipe. For example, in addition to the distance between a touch-down position and a touch-up position not exceeding a tap radius, an elapsed time between touch-down and touch-up may need to be within a predetermined time threshold in order for the associated touch event to be identified as a tap. A similar criterion may be evaluated in determining whether a touch event is identified as a swipe (in addition to those other criteria described above).

In addition, a number of variations, modifications, or the like are also included within the scope of this disclosure. For example, in certain example embodiments, a value of a gesture detection parameter may only be modified if the value of a vibration/environment metric exceeds a threshold value. For example, assuming that the vibration metric is a moving average of the magnitudes of a times series of acceleration vectors, if the value of the moving average does not meet or exceed a threshold value, a current value of a gesture detection parameter may remain unchanged.

Further, in certain example embodiments, an intended gesture that is not properly recognized based on an initial evaluation of gesture detection parameters having modified values, may nonetheless ultimately be correctly identified based on an evaluation of additional criteria. For example, a user may intend to tap a touch-sensitive display, but as a result of a sudden acceleration change (e.g., running over a pothole), may unintentionally perform a swipe action. The touch-down and touch-up positions associated with the unintentional swipe may fail to fall within the tap radius, and thus, the touch may not be recognized as a tap. Further, the swipe action may not be associated with a function in the manner in which it was performed.

In such embodiments, a first period of time associated with the touch event may be determined and a second period of time associated with the sudden acceleration change may also be determined from, for example, acceleration data. A determination may be made that the first period of time at least partially overlaps with the second period of time, that the acceleration change exceeds a first threshold value, and that the second period of time does not exceed a second threshold value. Based on these various determinations, the touch event may be identified as a tap despite the fact that the touch-down and touch-positions did not satisfy the tap radius.

The various modifications to gesture detection parameters described through reference to FIGS. 1A-1C may permit a variety of touch events to be identified as particular types of gestures under conditions that otherwise may have prevented the touch events from being properly identified as the gestures. Such conditions may include, without limitation, an increased vibration level for a user device and/or a user, an environmental condition that may result in an increased vibration level for a user device and/or a user, or an environmental condition that may otherwise indicate a reduced accuracy or precision of user interaction with a touch-sensitive display.

In particular, example embodiments of the disclosure may be applicable to a number of potential use cases. It should be appreciated that the example use cases described below are merely illustrative and not exhaustive. As an example of a non-limiting use case, a user's smartphone may be mounted within a vehicle that is in motion. The phone may detect various changes in motion resulting from road vibration and may adjust the tap radius accordingly. In response to an incoming call, the user may touch a button on the device to accept the call, and due to the road vibration, the user's finger may move along the display slightly. Since the tap radius was modified, however, the user's gesture may be identified as a tap despite the deviation between touch-down and touch-up, and a predetermined function (e.g., acceptance of the call) may be performed.

As another non-limiting example use case, a user may be operating a user device while running, walking, or the like. The user may wish to interact with the device by tapping on a particular user interface (UI) element (e.g., pause content that is playing on the device). The device may include image sensors that capture image data that may indicate considerable movement of the user's finger prior to contact with the touch-sensitive display. The device may accordingly increase the tap radius such that the user's intended tap is recognized as such. In other example embodiments, the image data may indicate vibration/movement of a user's finger prior to contact for any number of other reasons. For example, the user may suffer from a health condition (e.g., Parkinson's disease) that may result in considerable vibration/movement prior to interacting with a touch-sensitive display. In such example embodiments, the tap radius may be similarly increased to account for such vibration/movement.

As yet another non-limiting example use case, a user may be operating a user device (e.g., a smartphone) while running, walking, bicycling, etc. The phone's screen may turn off during periods of inactivity, which may lock the phone and require the user to perform a swipe gesture to unlock the phone. The device may sense the vibration and adjust the minimum swipe distance, threshold swipe angle, and/or peak permissible deviation accordingly in order to increase the likelihood that the user's intended swipe is identified as such. Additionally, or alternatively, the device may increase the tap radius based on the detected vibration, thereby increasing the likelihood that an intended tap is properly identified as such.

As still another non-limiting example use case, a user may be operating a user device on a cold day. A thermal sensor associated with the device may measure the ambient temperature and adjust the tap radius and/or various swipe related gesture detection parameters to compensate for the possibility that the user is wearing gloves or has shaky hands due to the cold and the potential inaccuracy that may result in gestures made on a touch-sensitive display of the device.

As yet another non-limiting example use case, a user may be operating a user device in a low light environment. An ambient light sensor associated with the device may measure the ambient light level and may adjust the tap radius and/or various swipe related gesture detection parameters to compensate for the potential inaccuracies that may be introduced into gestures as a result of the low light level.

As still another non-limiting example use case, a user may be grasping a user device in a non-conventional manner. Image sensors or other types of sensors may detect a positioning of the device within the user's hand and may adjust various gesture detection parameters accordingly.

Figure 1D:
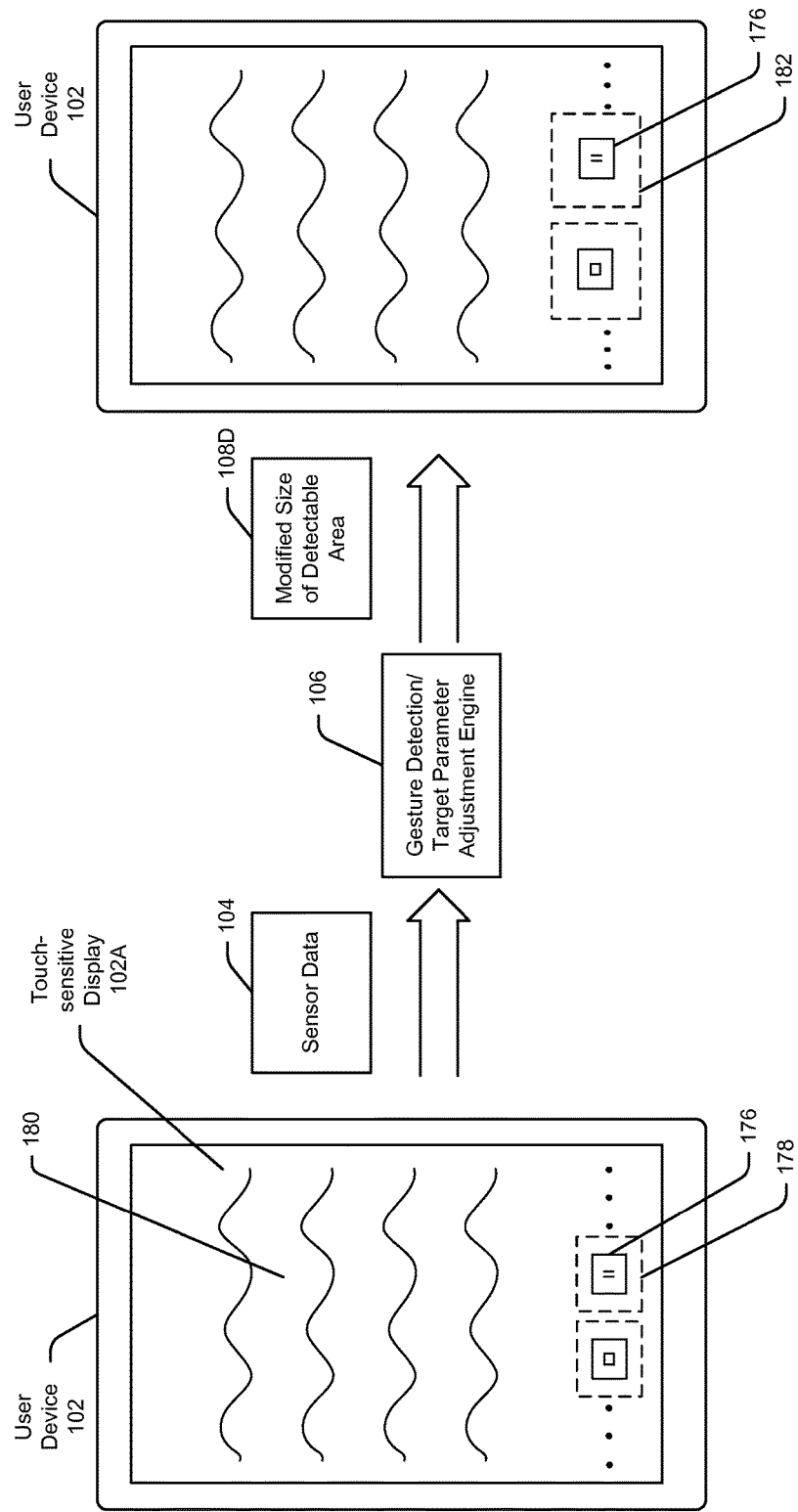
FIGS. 1D-1F are schematic diagrams illustrating various modifications that may be made to increase the likelihood that an intended target of a gesture is identified in accordance with one or more example embodiments of the disclosure.
Figure 1E:
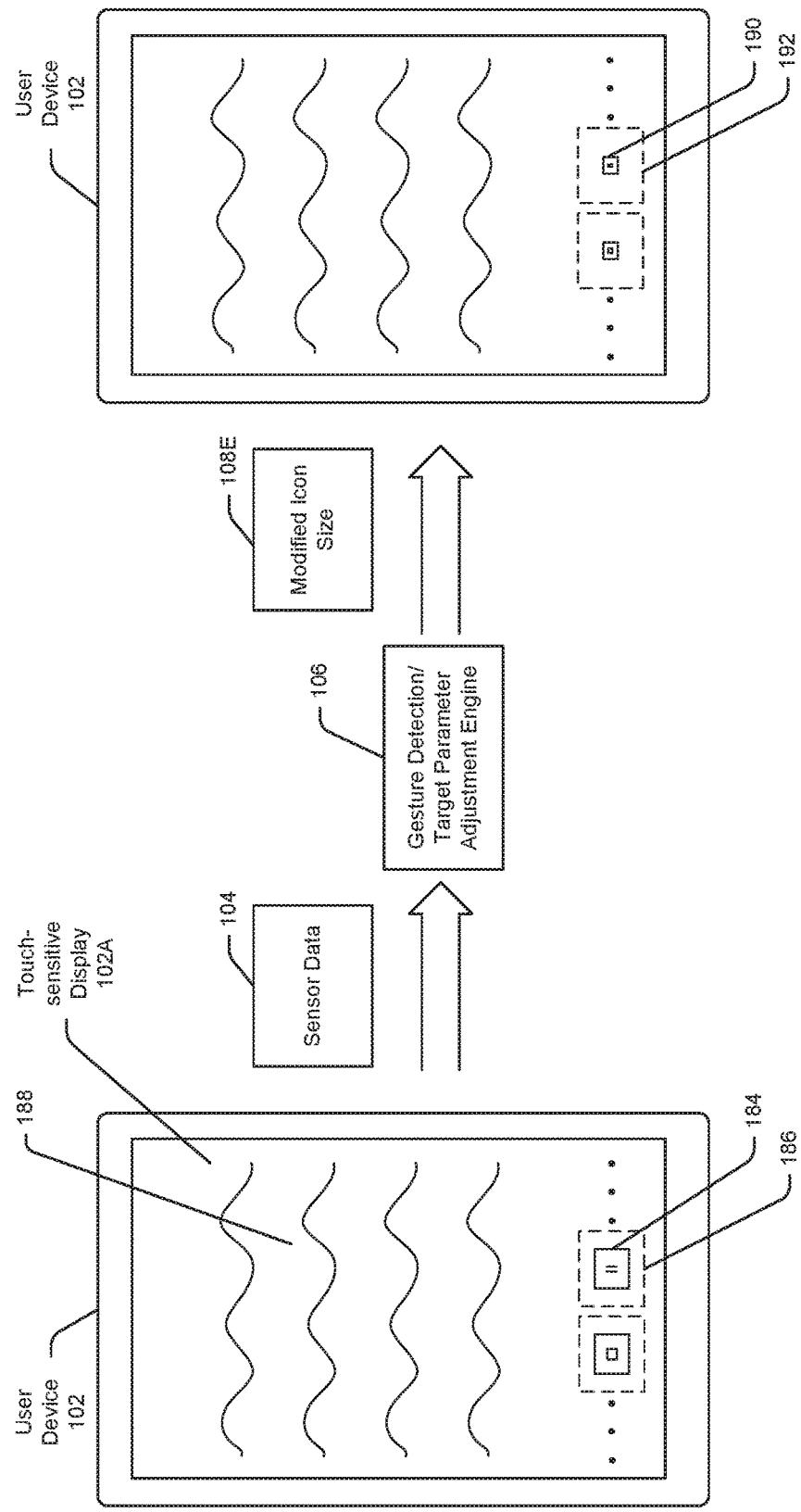
Figure 1F:
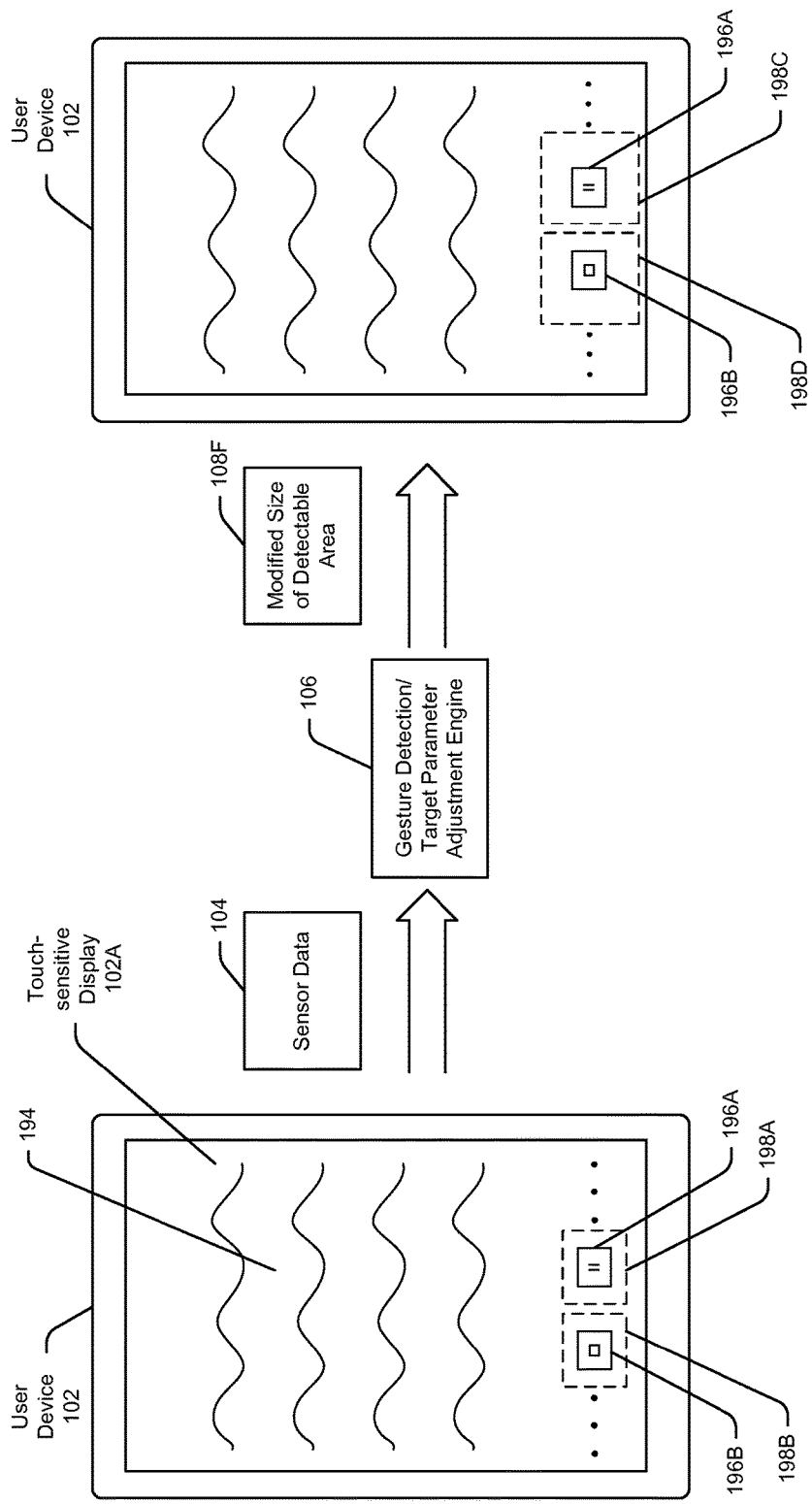

FIGS. 1D-1F are schematic diagrams illustrating various modifications that may be made to increase the likelihood that an intended target of a gesture is identified in accordance with one or more example embodiments of the disclosure.

The user device 102 including the touch-sensitive display 102A is once again depicted in FIG. 1D. Content 180 may be presented via the display 102A. Any of a variety of user interface elements may be presented via the display 102A as well. An example UI element 176 may be selectable by a tap gesture. In addition, a detectable area 178 may be provided in association with the UI element 176 such that if touch-down and/or touch-up occur within the detectable area 178, the UI element 176 is determined to be an intended target of the touch event.

The user device 102 may then receive sensor data 104 indicative of one or more vibrational and/or environmental characteristics associated with the user device 102, a user of the user device 102, and/or an environment in which the user device 102 is operated. The sensor data 104 may indicate an increase in the vibration/movement of the user device and/or the user, or an otherwise reduced accuracy or precision of user interaction with the touch-sensitive display 102A that may result, for example, from a change in environmental conditions. The gesture detection/target parameter adjustment engine 106 may determine a modified value for a vibration/environment metric based at least in part on the sensor data 104, and may further determine a modified value 108D for the size of the detectable area. In particular, the engine 106 may increase the size of the detectable area 178 to generate a modified detectable area 182 that is larger in size. Increasing the size of the detectable area associated with a selectable UI element may increase the likelihood that the intended target of a tap is properly identified despite inaccuracies in gestures that may result from increased vibration and/or a change in other environmental characteristics. In addition, as shown in FIG. 1D, the on-screen position of the UI element 176 may be modified in relation to the positions of one or more other UI elements.

In certain example embodiments, increasing the size of a detectable area of a user interface element may include associating a greater number of touch sensor coordinates with the user interface element. For example, a greater number of touch sensor coordinates may be associated with the user interface element by extending the detectable area outwardly from a reference location (e.g., a pixel associated with a center location of the user interface element) in a uniform manner in one or more directions.

Referring now to FIG. 1E, the user device 102 including the touch-sensitive display 102A is once again depicted. Content 188 may be presented via the display 102A. Any of a variety of user interface elements may be presented via the display 102A as well. An example UI element 184 may be selectable by a tap gesture. In addition, a detectable area 186 may be provided in association with the UI element 184 such that if touch-down and/or touch-up occur within the detectable area 186, the UI element 184 is determined to be an intended target of the touch event.

The user device 102 may then receive sensor data 104 indicative of one or more vibrational and/or environmental characteristics associated with the user device 102, a user of the user device 102, and/or an environment in which the user device 102 is operated. The sensor data 104 may indicate an increase in the vibration/movement of the user device and/or the user, or an otherwise reduced accuracy or precision of user interaction with the touch-sensitive display 102A that may result, for example, from a change in environmental conditions. The gesture detection/target parameter adjustment engine 106 may determine a modified value for a vibration/environment metric based at least in part on the sensor data 104, and may further determine a modified value 108E for the size of the selectable UI element. In particular, the engine 106 may decrease the size of the UI element 184 to generate a modified UI element 190 that is smaller in size within a detectable area 192. Decreasing the size of the selectable UI element may increase the likelihood that the intended target of a tap is properly identified despite inaccuracies in gestures that may result from increased vibration and/or a change in other environmental characteristics.

Referring now to FIG. 1F, the user device 102 including the touch-sensitive display 102A is once again depicted. Content 194 may be presented via the display 102A. Any of a variety of user interface elements may be presented via the display 102A as well. Example UI elements 196A, 196B may be selectable by a tap gesture. In addition, a detectable area 198A may be provided in association with the UI element 196A and a detectable area 198B may be provided in association with the UI element 196B such that if touch-down and/or touch-up occur within the detectable area 198A or 198B, the UI element 196A or the UI element 196B is respectively determined to be an intended target of the touch event.

The user device 102 may then receive sensor data 104 indicative of one or more vibrational and/or environmental characteristics associated with the user device 102, a user of the user device 102, and/or an environment in which the user device 102 is operated. The sensor data 104 may indicate an increase in the vibration/movement of the user device and/or the user, or an otherwise reduced accuracy or precision of user interaction with the touch-sensitive display 102A that may result, for example, from a change in environmental conditions. The gesture detection/target parameter adjustment engine 106 may determine a modified value for a vibration/environment metric based at least in part on the sensor data 104, and may further determine a modified value 108F for the size of detectable area. In particular, the engine 106 may increase the size of the detectable area 198A to produce the detectable area 198C and may increase the size of the detectable area 198B to produce the detectable area 198D. The relative positions, however, of the UI elements 196A and 196B may remain unchanged.

Figure 2:
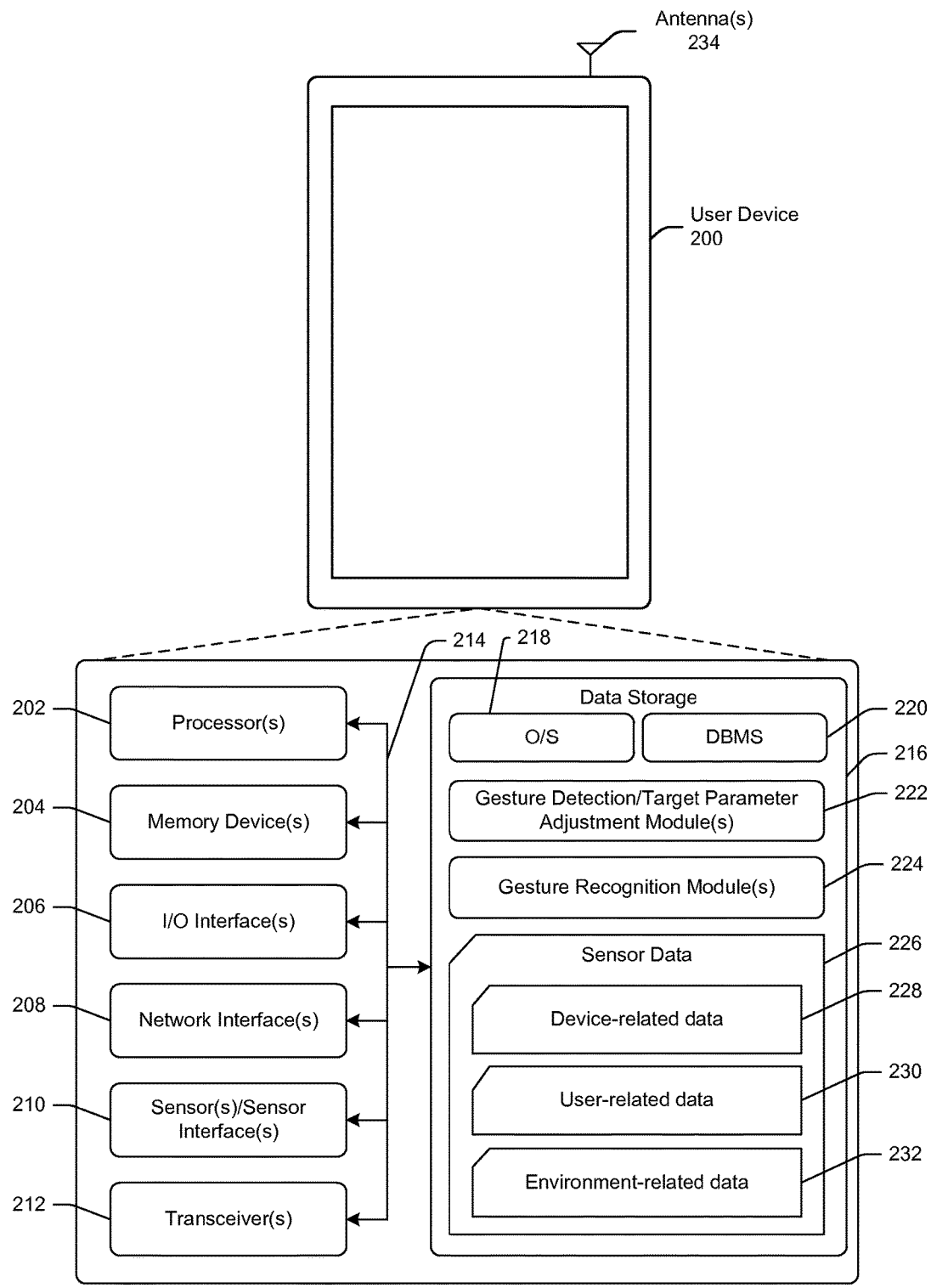
FIG. 2 is a schematic block diagram of an illustrative user device in accordance with one or more example embodiments of the disclosure.

FIG. 2 is a schematic block diagram of an illustrative user device 200 in accordance with one or more example embodiments of the disclosure. The user device 200 may include any suitable computing device including, but not limited to, a mobile device such as a smartphone, tablet, e-reader, or the like; a desktop computer; a laptop computer, and so forth. The user device 200 may represent an illustrative device configuration for the user device 102.

The device 200 may be configured to communicate via one or more networks (not shown) with one or more servers, user devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 200 may include one or more processors (processor(s)) 202, one or more memory devices 204 (generically referred to herein as memory 204), one or more input/output ("I/O") interface(s) 206, one or more network interfaces 208, one or more sensors or sensor interfaces 210, one or more transceivers 212, and data storage 216. The device 200 may further include one or more buses 214 that functionally couple various components of the device 200. The device 200 may further include one or more antennas 234 that may include, without limitation, a cellular antenna for transmitting or receiving signals to/from a cellular network infrastructure, an antenna for transmitting or receiving Wi-Fi signals to/from an AP, an antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 214 may include at least one of a system bus, a memory bus, an address bus, or a message bus, and may permit exchange of information (e.g., data (including computer-executable code), signaling, etc.) between various components of the device 200. The bus(es) 214 may have any of a variety of bus structures including, without limitation, a memory bus or a memory controller, a peripheral bus, an accelerated graphics port, and so forth. The bus(es) 214 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 204 of the device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 216 may include removable storage and/or non-removable storage including, but not limited to, magnetic storage, optical disk storage, and/or tape storage. The data storage 216 may provide non-volatile storage of computer-executable instructions and other data. The memory 204 and the data storage 216, removable and/or non-removable, are examples of computer-readable storage media (CRSM) as that term is used herein.

The data storage 216 may store computer-executable code, instructions, or the like that may be loadable into the memory 204 and executable by the processor(s) 202 to cause various operations to be performed. The data storage 216 may additionally store data that may be copied to memory 204 for use by the processor(s) 202 during the execution of the computer-executable instructions. Moreover, output data generated as a result of execution of the computer-executable instructions by the processor(s) 202 may be stored initially in memory 204, and may ultimately be copied to data storage 216 for non-volatile storage.

More specifically, the data storage 216 may store one or more operating systems (O/S) 218; one or more database management systems (DBMS) 220; and one or more program modules, applications, or the like such as, for example, one or more gesture detection/target parameter adjustment module(s) 222, one or more gesture recognition module(s) 224. In addition, the data storage 216 may store various types of data such as, for example, sensor data 226 which may include device-related data 228 (e.g., acceleration data), user-related data 230 (e.g., image data), and/or environment-related data 232 (e.g., temperature data, ambient light data, etc.). While not depicted in FIG. 2, the data storage 216 may store any of a variety of other types of data such as, for example, values for one or more vibration/environment metrics, gesture detection parameter determination function definitions, values for various gesture detection parameters, values for various gesture target parameters, and so forth.

Any of the modules depicted in FIG. 2 may include computer-executable code, instructions, or the like that may be loaded into the memory 204 for execution by one or more of the processor(s) 202. Further, any data (e.g., sensor data 226) may be loaded into the memory 204 for use by the processor(s) 202 in executing computer-executable code. For example, at least a portion of the sensor data 226 may be loaded from the data storage 216 to the memory 204 to facilitate the generation of a value for a vibration/environment metric and/or the determination of a value for a gesture detection parameter based on the generated vibration/environment metric value.

The processor(s) 202 may be configured to access the memory 204 and execute computer-executable instructions loaded therein. For example, the processor(s) 202 may be configured to execute computer-executable instructions of the various program modules of the user device 200 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality supported by the various program modules depicted in FIG. 2, the gesture detection/target parameter adjustment module(s) 222 may include computer-executable instructions, code, or the like that, responsive to execution by one or more of the processor(s) 202, may cause any of a variety of processing to be performed such as, for example, determining a value of a vibration/environment metric based on sensor data, applying a gesture detection parameter determination function to determine value(s) for one or more gesture detection parameters based on the value of a vibration/environment metric, determining value(s) for one or more gesture target parameter(s), and so forth. In certain example embodiments, responsive to execution of computer-executable instructions provided as part of the gesture detection/target parameter adjustment module(s) 222, a current value of a gesture detection parameter (e.g., a tap radius, a swipe minimum distance, a threshold swipe angle, a peak permissible deviation, etc.) may be modified to a second value based on a modified value of a vibration/environment metric. The modified value of the vibration/environment metric may have been generated from updated sensor data indicating changed vibrational and/or environment characteristics that may be reflective of an increase or decrease in the vibration level of a user device and/or a user, or an otherwise increased or decreased likelihood of inaccuracy or imprecision in user interaction with a touch-sensitive display.

The gesture recognition module(s) 224 may include computer-executable instructions, code, or the like that, responsive to execution by one or more of the processor(s) 202, may cause operations to be performed for analyzing touch input corresponding to a touch event associated with a touch-sensitive display of the user device 200 to determine whether the touch event corresponds to a particular type of gesture, and to further determine an intended target of the touch event. In doing so, the gesture recognition module(s) 224 may leverage gesture detection parameter values and gesture target parameter values generated responsive to execution of computer-executable instructions of the gesture detection/target parameter adjustment module(s) 222 in order to determine whether the criteria for determining that a touch event is a particular type of gesture is satisfied, and if so, to potentially determine an intended target of the gesture.

While not depicted in FIG. 2, the data storage 216 may store any number of other application module(s) that may include computer-executable instructions, code, or the like that responsive to execution by one or more of the processor(s) 202 may cause any of a variety of application processing to be performed. Other application module(s) may form part of, for example, word processing applications, mobile applications, navigation applications, browser applications, and so forth.

The O/S 218 may be loaded from the data storage 216 into the memory 204 and may provide an interface between other application software executing on the device 200 and hardware resources of the device 200. More specifically, the O/S 218 may include a set of computer-executable instructions for managing hardware resources of the device 200 and for providing common services to other application programs (e.g., managing memory allocation among various application programs). The O/S 218 may include any operating system now known or which may be developed in the future including, but not limited to, any server operating system, any mainframe operating system, or any other proprietary or non-proprietary operating system.

The DBMS 220 may be loaded into the memory 204 and may support functionality for accessing, retrieving, storing, and/or manipulating data stored in the memory 204 and/or data stored in the data storage 216. The DBMS 220 may use any of a variety of database models (e.g., relational model, object model, etc.) and may support any of a variety of query languages. The DBMS 220 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 200 is a mobile device, the DBMS 220 may be any suitable light-weight DBMS optimized for performance on a mobile device.

Referring now to other illustrative components of the device 200, one or more input/output (I/O) interfaces 206 may be provided that may facilitate the receipt of input information by the device 200 from one or more I/O devices as well as the output of information from the device 200 to the one or more I/O devices. The I/O devices may include, for example, one or more user interface devices that facilitate interaction between a user and the device 200 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The device 200 may further include one or more network interfaces 208 via which the device 200 may communicate with any of a variety of other systems, platforms, networks, devices, and so forth. Such communication may occur via any of the types of networks previously described.

The antenna(s) 234 may include any suitable type of antenna depending, for example, on the communications protocols used to transmit or receive signals via the antenna(s) 234. Non-limiting examples of suitable antennas may include directional antennas, non-directional antennas, dipole antennas, folded dipole antennas, patch antennas, multiple-input multiple-output (MIMO) antennas, or the like. The antenna(s) 234 may be communicatively coupled to one or more transceivers 212 or radio components to which or from which signals may be transmitted or received.

As previously described, the antenna(s) 234 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 234 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna 234 may be configured to transmit or receive radio frequency signals within any suitable frequency range forming part of the unlicensed portion of the radio spectrum.

The antenna(s) 234 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 212 may include any suitable radio component(s) for—in cooperation with the antenna(s) 234—transmitting or receiving radio frequency (RF) signals in the bandwidth and/or channels corresponding to the communications protocols utilized by the device 200 to communicate with other devices. The transceiver(s) 212 may include hardware, software, and/or firmware for modulating, transmitting, or receiving—potentially in cooperation with any of antenna(s) 234—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 212 may further include hardware, firmware, or software for receiving GNSS signals. The transceiver(s) 212 may include any known receiver and baseband suitable for communicating via the communications protocols utilized by the device 200. The transceiver(s) 212 may further include a low noise amplifier (LNA), additional signal amplifiers, an analog-to-digital (A/D) converter, one or more buffers, a digital baseband, or the like.

The sensor(s)/sensor interface(s) 210 may include or may be capable of interfacing with any suitable type of sensing device such as, for example, inertial sensors, force sensors, thermal sensors, ambient light sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 2 as being stored in the data storage 216 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 200, and/or hosted on other computing device(s) accessible via one or more networks, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the system architecture in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the device 200 may include alternate and/or additional hardware, software, or firmware components beyond those described or depicted without departing from the scope of the disclosure. More particularly, it should be appreciated that software, firmware, or hardware components depicted as forming part of the device 200 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
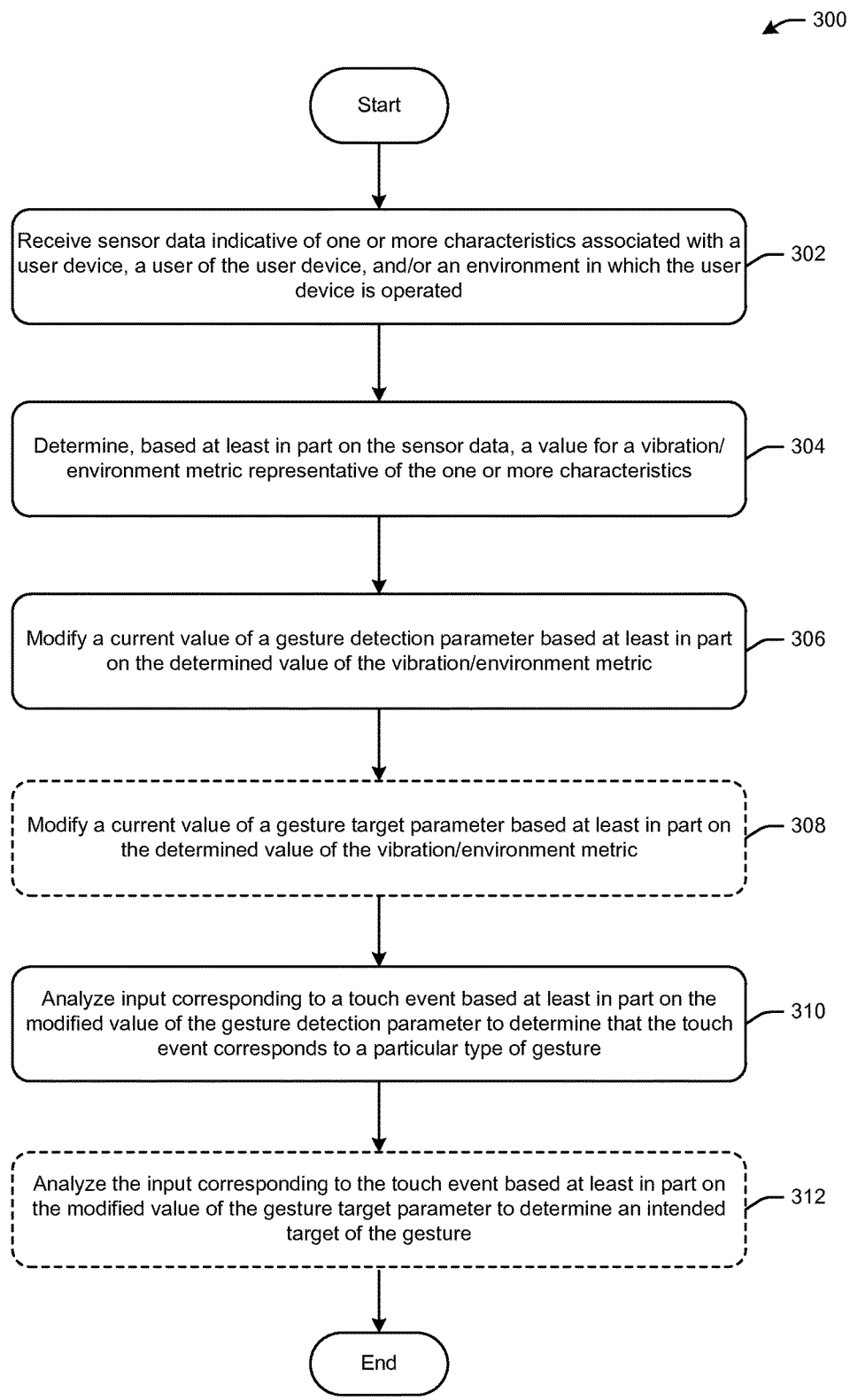
FIG. 3 is a process flow diagram of an illustrative method for determining a value of a metric representative of vibrational and/or environmental characteristics based at least in part on sensor data, modifying the value of a gesture detection parameter based at least in part on the determined value of the metric, and analyzing touch input based at least in part on the modified value of the gesture detection parameter to determine that a touch event corresponds to a particular type of gesture in accordance with one or more example embodiments of the disclosure.

FIG. 3 is a process flow diagram of an illustrative method 300 for determining a value of a metric representative of vibrational and/or environmental characteristics based at least in part on sensor data, modifying the value of a gesture detection parameter based at least in part on the determined value of the metric, and analyzing touch input based at least in part on the modified value of the gesture detection parameter to determine that a touch event corresponds to a particular type of gesture in accordance with one or more example embodiments of the disclosure.

One or more operations of the method 300 may be described below as being performed by a device 200, or more specifically, by one or more program modules, applications, or the like executing on such the device 200. It should be appreciated, however, that any of the operations of method 300 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 300 may be described in the context of the illustrative device 200, it should be appreciated that such operations may be implemented in connection with numerous other device configurations.

At block 302, sensor data may be received via one or more sensors. The sensor data may include any of the example types of data previously described such as, for example, acceleration data captured by one or more inertial sensors, image data, thermal data, ambient light data, and so forth. The sensor data may be indicative of one or more vibrational and/or environmental characteristics associated with a user device, a user of the user device, and/or an environment in which the user device is operated.

At block 304, computer-executable instructions of the gesture detection/target parameter adjustment module(s) 222 may be executed to determine, based at least in part on the sensor data, a value for a vibration/environment metric representative of the vibrational and/or environmental characteristics reflected in the sensor data. In certain example embodiments, the vibration/environment metric may serve as a proxy for a vibration level of a user device and/or a user, or as a quantitative measure of a level of inaccuracy or imprecision that may be associated with user interaction with a touch-sensitive display. For example, in certain example embodiments, a moving average of a time series of magnitudes of acceleration vectors may serve as the vibration metric. In other example embodiments, an ambient temperature, an ambient light level, or the like may serve as the environment metric. It should be appreciated that any suitable vibration/environment metric may be chosen.

At block 306, computer-executable instructions of the gesture detection/target parameter adjustment module(s) 222 may be executed to modify a current value of a gesture detection parameter based at least in part on the determined value of the vibration/environment metric. The gesture detection parameter whose value may be modified may include, without limitation, a tap radius, a minimum swipe distance, a threshold swipe angle, a peak permissible deviation, and so forth. It should be appreciated that the values of multiple gesture detection parameters may be modified based at least in part on the determined value of the vibration/environment metric.

Figure 4:
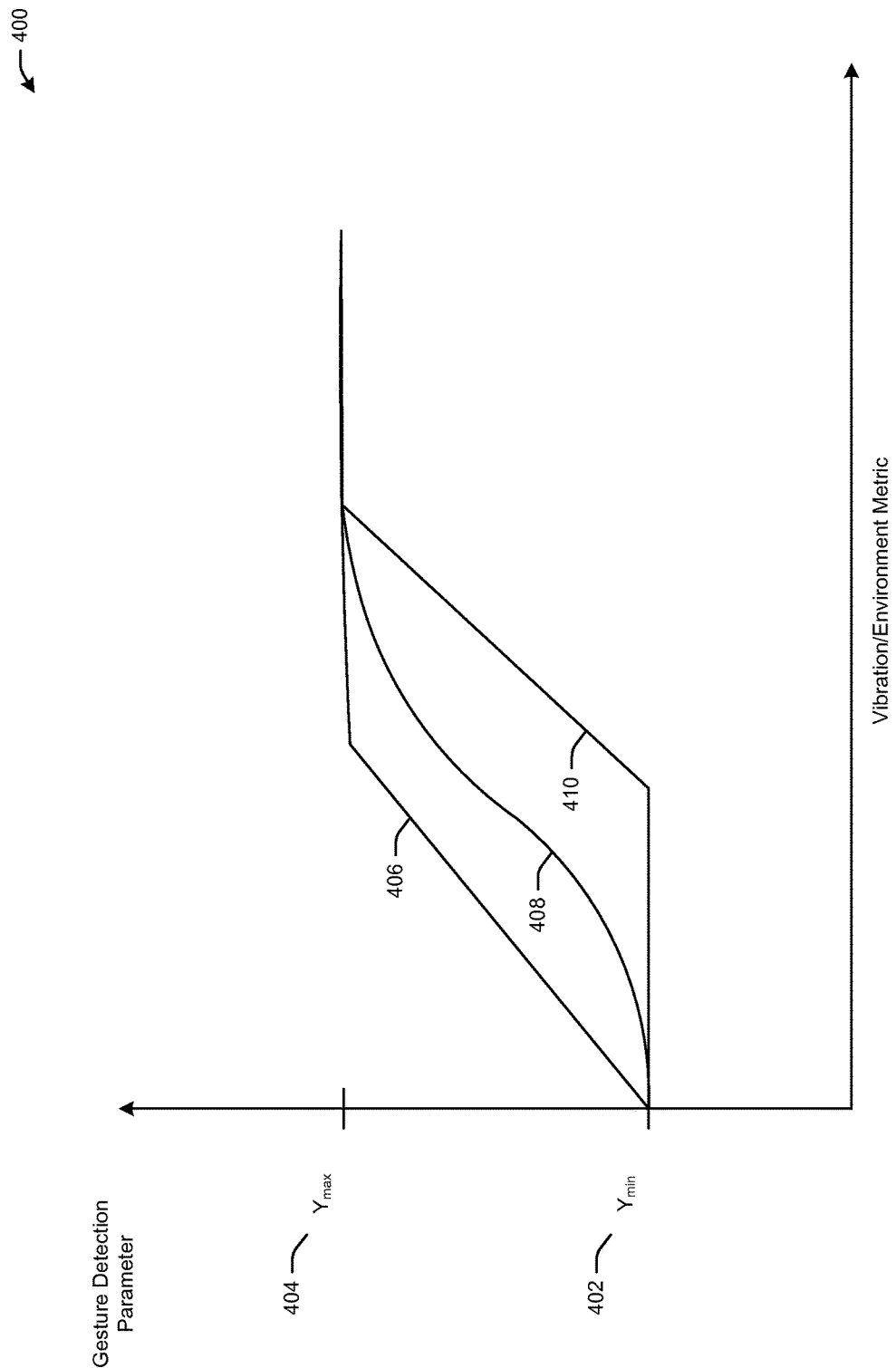
FIG. 4 is a schematic diagram of various potential relationships between a gesture detection parameter and a metric indicative of vibrational and/or environmental characteristics associated with a device, a user, and/or an environment in which the device is used in accordance with one or more example embodiments of the disclosure.

As previously described, a gesture detection parameter determination function may be used to determine a modified value of a gesture detection parameter. FIG. 4 is a schematic diagram of various potential gesture detection parameter determination functions in accordance with one or more example embodiments of the disclosure. As shown in FIG. 4, the gesture detection parameter determination function may include various types of continuous functions 406, 410 having linear portions, a sigmoidal function 408, and so forth. Each of the gesture detection parameter determination functions may map a range of values for a vibration or environment metric to a corresponding range of values for a gesture detection parameter. In certain example embodiments, the range of values for the gesture detection parameter may be bounded by a minimum value 402 for the gesture detection parameter and a maximum value 404 for the gesture detection parameter. For example, the value of a tap radius may lie between a minimum tap radius and a maximum tap radius across a range of values for a vibration or environment metric. In certain example embodiments, the value of the vibration or environment metric may represent a magnitude (e.g., amplitude) of one or more sensor signals. In certain example embodiments, the value of a gesture detection parameter may increase immediately from the minimum value 402 towards the maximum value 404 as the value of the vibration/environment metric increases from a non-zero value such as, for example, in accordance with functions 406 and 408. In other example embodiments, the value of the vibration/environment metric may need to first overcome a threshold value before an increase in the value of the gesture detection parameter occurs such as, for example, according to function 410.

It should be appreciated with certain types of gesture detection parameters (e.g., a minimum swipe distance), as the value of a vibration or environment metric increases, the value of the gesture detection parameter may decrease from the maximum value 404 to the minimum value 402. Further, while not shown in FIG. 4, additional gesture detection parameter determination functions may be used such as, for example, a step-wise function that results in discrete changes to the value of gesture detection parameter at particular values of a vibration or environment metric.

Referring again to FIG. 3, at optional block 308, computer-executable instructions of the gesture detection/target parameter adjustment module(s) 222 may be executed to modify a current value of a gesture target parameter based at least in part on the determined value of the vibration/environment metric. For example, a size of a detectable area corresponding to a UI element may be increased, a size of the UI element itself may be decreased or increased, and so forth.

At block 310, computer-executable instructions of the gesture recognition module(s) 224 may be executed to analyze input corresponding to a touch event based at least in part on the modified value of the gesture detection parameter to determine that the touch event corresponds to a particular type of gesture. For example, the input may be analyzed with respect to a modified tap radius to determine that the touch event is a tap. As another non-limiting example, the input may be analyzed with respect to a modified minimum swipe distance, a modified threshold swipe angle, and/or a modified peak permissible deviation to determine that the touch input is a swipe.

At optional block 312, computer-executable instructions of the gesture recognition module(s) 224 may be executed to analyze the input corresponding to the touch event based at least in part on the modified value of the gesture detection parameter to determine an intended target of the gesture. For example, if the touch event is determined to be a tap at block 310, then at block 312, an intended target of the tap may be determined based on an analysis of the input with respect to a modified gesture target detection parameter.

The operations described and depicted in the illustrative method 300 of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    receiving, at a user device, motion sensor data indicative of movements of the user device over a period of time;
    determining, by one or more computer processors of the user device, a value of a vibration metric representative of the movements of the user device based at least in part on the motion sensor data, wherein the value of the vibration metric is a measure of a level of vibration of the user device over the period of time;
    selecting, by the one or more computer processors, a value for a gesture detection parameter based at least in part on the value of the vibration metric, wherein the gesture detection parameter comprises at least one of a tap radius or a swipe angle, and wherein the value of the gesture detection parameter is selected to compensate for reduced gesture accuracy caused by the level of vibration of the user device;
    receiving, by the one or more computer processors, a touch input corresponding to a touch event detected at a touch-sensitive display of the user device;
    determining, by the one or more computer processors and based at least in part on the touch input, that the touch event does not include interaction with a touch input coordinate that lies outside of a boundary defined by the value of the gesture detection parameter; and
    determining, by the one or more computer processors, that the touch event corresponds to a tap or a swipe based at least in part on determining that the touch event does not include interaction with a touch input coordinate that lies outside of the boundary defined by the value of the gesture detection parameter.

2. The method of claim 1, wherein the period of time is a first period of time and the value of the gesture detection parameter is a first tap radius value, and wherein analyzing the touch input to determine that the touch event corresponds to a tap or a swipe comprises:
    determining, by the one or more computer processors, that a distance between a first position on the touch-sensitive display corresponding to initiation of the touch event and a second position on the touch-sensitive display corresponding to completion of the touch event does not exceed the first tap radius value;
    determining, by the one or more computer processors, that an elapsed time between a first time associated with the initiation of the touch event and a second time associated with the completion of the touch event does not exceed a time threshold; and
    determining, by the one or more computer processors, that the touch event corresponds to the tap responsive, at least in part, to determining that the distance between the first position and the second position does not exceed the first tap radius value and determining that the elapsed time does not exceed the time threshold,
    wherein the distance between the first position and the second position exceeds a second tap radius value associated with a level of vibration over a second period of time that is less than the level of vibration over the first period of time.

3. The method of claim 1, wherein the period of time is a first period of time and the value of the gesture detection parameter is a first threshold swipe angle, and wherein analyzing the touch input to determine that the touch event corresponds to a tap or a swipe comprises:
    determining, by the one or more computer processors, that a distance between a first position on the touch-sensitive display corresponding to initiation of the touch event and a second position on the touch-sensitive display corresponding to completion of the touch event meets or exceeds a minimum swipe distance;
    determining, by the one or more computer processors, that a swipe angle between a path traversed on the touch-sensitive display between the first position and the second position and a reference line does not exceed the first threshold swipe angle; and
    determining, by the one or more computer processors, that the touch event corresponds to the swipe responsive, at least in part, to determining that the distance between the first position and the second position meets or exceeds the minimum swipe distance and determining that the swipe angle does not exceed the first threshold swipe angle,
    wherein the swipe angle exceeds a second threshold swipe angle associated with a level of vibration over a second period of time that is less than the level of vibration over the first period of time.

4. A method, comprising:
    determining a vibration level using sensor data;
    determining, by one or more computer processors, a value of a gesture detection parameter based at least in part on the vibration level;
    receiving, by the one or more computer processors, input detected by at least one input component; and determining, by the one or more computer processors, that the input corresponds to a particular type of gesture based at least in part on the value of the gesture detection parameter.

5. The method of claim 4, wherein the value of the gesture detection parameter is a tap radius value, and wherein determining that the input corresponds to a particular type of gesture comprises:
  determining, by the one or more computer processors, that a distance between a first position on a touch-sensitive display corresponding to initiation of a touch event and a second position on the touch-sensitive display corresponding to completion of the touch event does not exceed the tap radius value;
  determining, by the one or more computer processors, that an elapsed time between a first time associated with the initiation of the touch event and a second time associated with the completion of the touch event does not exceed a time threshold; and
  determining, by the one or more computer processors, that the input corresponds to a tap responsive, at least in part, to determining that the distance between the first position and the second position does not exceed the tap radius value and determining that the elapsed time does not exceed the time threshold.

6. The method of claim 5, wherein the tap radius value is a first tap radius value associated with a first vibration value representative of the vibrational level over a first period of time, wherein the distance between the first position and the second position exceeds a second tap radius value associated with a second vibration value representative of the vibrational level over a second period of time, and wherein the first vibration value indicates a greater amount of vibration than the second vibration value.

7. The method of claim 4, wherein the value of the gesture detection parameter is a threshold swipe angle, and wherein determining that the input corresponds to a particular type of gesture comprises:
  determining, by the one or more computer processors, that a swipe angle between a path traversed on a touch-sensitive display between a first position on the touch-sensitive display corresponding to initiation of a touch event and a second position on the touch-sensitive display corresponding to completion of the touch event and a reference line does not exceed the threshold swipe angle; and
  determining, by the one or more computer processors, that the input corresponds to a swipe responsive, at least in part, to determining that the swipe angle does not exceed the threshold swipe angle.

8. The method of claim 7, wherein the gesture detection parameter is a first gesture detection parameter, the method further comprising:
  determining, by the one or more computer processors, a value of a second gesture detection parameter based at least in part on the vibration level, wherein the value of the second gesture detection parameter is a minimum swipe distance, and
  wherein determining that the input corresponds to a particular type of gesture further comprises:
    determining, by the one or more computer processors, that a distance between the first position and the second position meets or exceeds the minimum swipe distance,
    wherein the input is determined to correspond to a swipe further responsive, at least in part, to determining that the distance between the first position and the second position meets or exceeds the minimum swipe distance.

9. The method of claim 8, wherein the threshold swipe angle is a first threshold swipe angle associated with a first vibration value representative of the vibrational level over a first period of time and the minimum swipe distance is a first minimum swipe distance associated with the first vibration value, wherein the distance between the first position and the second position does not exceed a second minimum swipe distance associated with a second vibration value representative of the vibrational level over a second period of time or the swipe angle exceeds a second threshold swipe angle associated with the second vibration value, and wherein the first vibration value indicates a greater amount of vibration than the second vibration value.

10. The method of claim 4, wherein the value of the gesture detection parameter is a threshold deviation from a threshold swipe angle, and wherein determining that the input corresponds to a particular type of gesture comprises:
  determining, by the one or more computer processors, that a distance between a first position on a touch-sensitive display corresponding to initiation of a touch event and a second position on the touch-sensitive display corresponding to completion of the touch event meets or exceeds a minimum swipe distance;
  determining, by the one or more computer processors, that a peak distance between a location of a path traversed on the touch-sensitive display between the first position and the second position and a corresponding location of a boundary line associated with the threshold swipe angle does not exceed the threshold deviation; and
  determining, by the one or more computer processors, that the input corresponds to a swipe responsive, at least in part, to determining that the distance between the first position and the second position meets or exceeds the minimum swipe distance and determining that the peak distance does not exceed the threshold deviation.

11. The method of claim 10, wherein the threshold deviation is a first threshold deviation associated with a first vibration value representative of the vibrational level over a first period of time, wherein the peak distance exceeds a second threshold deviation associated with a second vibration value representative of the vibrational level over a second period of time, and wherein the first vibration value indicates a greater amount of vibration than the second vibration value.

12. The method of claim 4, wherein determining the first value of the gesture detection parameter comprises:
  determining, by the one or more computer processors, a value representative of the vibrational level based at least in part on the sensor data; and
  applying, by the one or more computer processors, a gesture detection parameter determination function to the value representative of the vibrational level to generate the value of the gesture detection parameter, wherein the gesture detection parameter determination function comprises one of: a continuous function having a linear portion, a step-wise function, or a sigmoidal function.

13. The method of claim 4, further comprising:
  determining, by the one or more computer processors, that a value representative of the vibrational level meets or exceeds a threshold value; and
  modifying a prior value of the gesture detection parameter to generate the value of the gesture detection parameter responsive, at least in part, to determining that the value representative of the vibrational level meets or exceeds the threshold value.

14. The method of claim 4, wherein the sensor data comprises at least one of acceleration data indicative of an amount of vibration of a user device, image data indicative of an amount of vibration of a user, thermal data indicative of an ambient temperature, audio data indicative of an audio signature, or ambient light data indicative of an amount of ambient light.

15. The method of claim 4, wherein the sensor data comprises acceleration data indicative of the vibrational level, wherein the value of the gesture detection parameter is a tap radius value, and wherein determining that the input corresponds to a particular type of gesture comprises:

determining, by the one or more computer processors, that a distance between a first position on a touch-sensitive display corresponding to initiation of a touch event and a second position on the touch-sensitive display corresponding to completion of the touch event exceeds the tap radius value;

determining, by the one or more computer processors, a first period of time associated with the touch event;

determining, by the one or more computer processors, that the acceleration data indicates an acceleration change associated with a second period of time;

determining, by the one or more computer processors, that the first period of time at least partially overlaps with the second period of time;

determining, by the one or more computer processors, that the acceleration change exceeds a first threshold value and that the second period of time does not exceed a second threshold value; and determining, by the one or more computer processors, that the input corresponds to a tap responsive, at least in part, to determining that the first period of time at least partially overlaps with the second period of time, that the acceleration change exceeds the first threshold value, and that the second period of time does not exceed the second threshold value.

16. The method of claim 4, wherein the sensor data comprises audio data, the method further comprising:

determining an audio signature from the audio data; and determining an intensity of the audio data, wherein the vibration level is associated with the audio signature and the intensity of the audio data.

17. A device, comprising:
at least one input component;
at least one memory storing computer-executable instructions; and
at least one processor configured to access the at least one memory and execute the computer-executable instructions to:
determine a vibration level using sensor data;
determine a value of a gesture detection parameter based at least in part on the vibration level;
determine a value of a gesture target parameter based at least in part on the vibration level;
receive input detected by the at least one input component;
determine that the input corresponds to a particular type of gesture based at least in part on the value of the gesture detection parameter; and
determine a target of the particular type of gesture based at least in part on the value of the gesture target parameter.

18. The device of claim 17, wherein the value of the gesture detection parameter is a tap radius value, and wherein the at least one processor is configured to determine that the input corresponds to a particular type of gesture by executing the computer-executable instructions to:
determine that a distance between a first position on a touch-sensitive display corresponding to initiation of a touch event and a second position on the touch-sensitive display corresponding to completion of the touch event does not exceed the tap radius value; and
determine that the input corresponds to a tap responsive, at least in part, to determining that the distance between the first position and the second position does not exceed the tap radius value.

19. The device of claim 18, wherein the value of the gesture target parameter is a detectable area corresponding to a user interface element presented on the touch-sensitive display, and wherein the at least one processor is configured to determine the target of the particular type of gesture by executing the computer-executable instructions to:
determine that the first position and the second position are within the detectable area; and
determine that the target of the tap is the user interface element responsive to determining that the first position and the second position are within the detectable area.

20. The device of claim 19, wherein the at least one processor is further configured to execute the computer-executable instructions to:
reduce a size of the user interface element in relation to the detectable area.

\* \* \* \* \*